April 1, 1924.
C. C. HANSEN
1,488,493
AUTOMOBILE BUMPER STRUCTURE
Filed Jan. 4, 1921
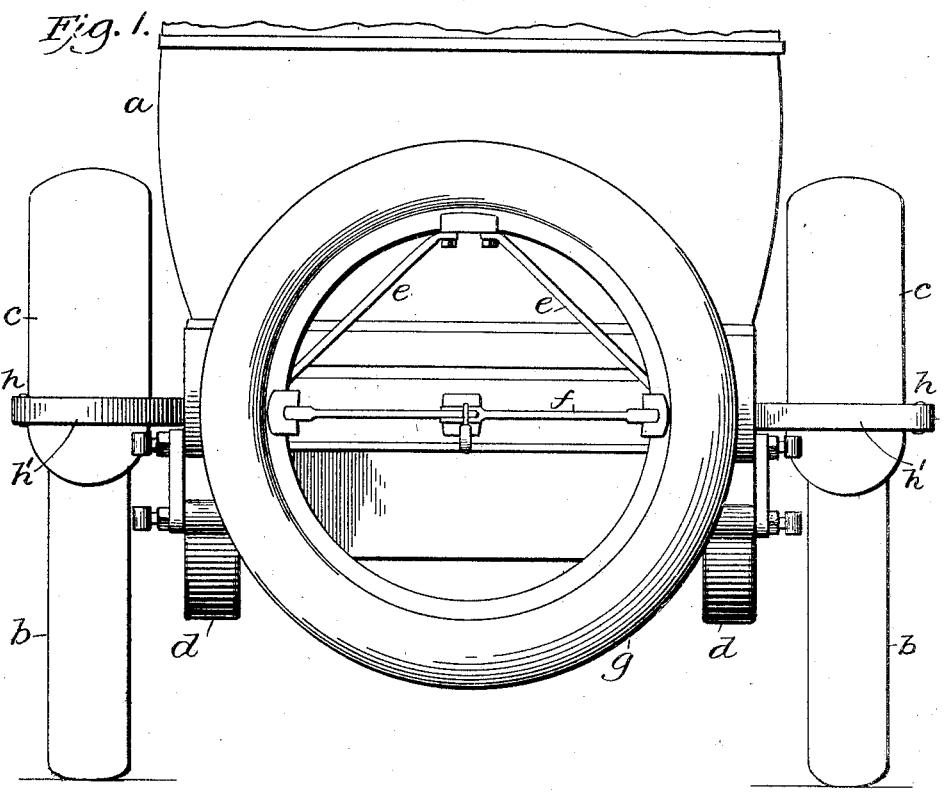
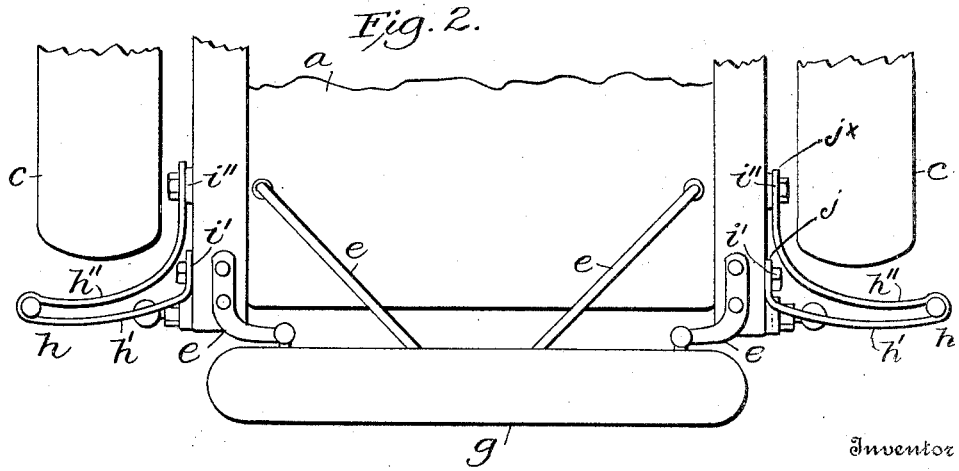

Patented Apr. 1, 1924.

1,488,493

UNITED STATES PATENT OFFICE.

CONRAD C. HANSEN, OF SAN FRANCISCO, CALIFORNIA, ASSIGNOR TO HOOVER SPRING COMPANY, OF SAN FRANCISCO, CALIFORNIA, A CORPORATION OF CALIFORNIA.

AUTOMOBILE BUMPER STRUCTURE.

Application filed January 4, 1921. Serial No. 434,964.

*To all whom it may concern:*

Be it known that I, CONRAD C. HANSEN, a citizen of the United States of America, residing at the city and county of San Francisco, State of California, have invented certain new and useful Improvements in Automobile Bumper Structures, of which the following is a specification, reference being had to the accompanying drawings.

This invention relates to improvements in means for preventing the damage that is done to automobiles by collisions therebetween or with other objects, and particularly to improvements in the structures that are commonly known as automobile bumpers or fenders; and an object of this invention is to provide an automobile bumper structure which will prove simple in construction, comparatively cheap in manufacture and low in cost of installation and of repair, and highly efficient and durable in operation and use.

In the drawings illustrating the principle of this invention and the best mode now known to me of applying that principle, Fig. 1 is an elevation of so much of the rear of an automobile as is deemed necessary to illustrate this invention; and Fig. 2 is a plan of the same.

The body $a$ of the automobile, the wheels $b$ thereof, the mud-guards or wheel-guards $c$ (sometimes called fenders) and the springs $d$ are of any suitable type and are shown conventionally. To the rear of the body $a$, there is attached, as by means of the attaching-irons $e$, a tire-carrier $f$, which may be of any suitable construction and which, as illustrated, is of the type described and shown in the patent granted Edward Downing, September 5, 1916, No. 1,197,272. Upon this tire-carrier $f$, there is mounted a spare tire $g$; it will be understood that, of course, more than one spare tire may be carried by the tire-carrier $f$.

At each side of the automobile-body $a$, there is suitably fastened a wheel-guard fender or bumper-wing $h$, which is constructed of a single piece of flat, spring steel that is bent back upon itself to form a narrow, elongated loop. The loop of the bumper-wing (or wheel-guard fender) $h$ comprises two arms $h'$, $h''$, which are integral with each other, the outer or collision arm $h'$ extending outwardly and laterally from the side of the body $a$ and then bending back upon and parallel with itself to form the inner arm $h''$. The free inner end of the arm $h''$ is bent inwardly or towards the mud-guard $c$ and forms a tang $j^x$ which is fastened to the body $a$ at $i''$, while the inner end of the outer or collision arm $h'$ is fastened thereto at $i'$. The inner arm $h''$ affords support to the collision arm $h'$ during collision action and the structure is strong and adapted to resist the stress which it is designed to sustain in use. It is to be noted that the loop-forming arms are bent into a concavo-convex shape and that the concave sides of these arms face the mud-guards. Furthermore, the loop-forming arms lie so closely together as to preclude the insertion therebetween of the mud-guard $c$ protected by them, and the mud-guard lies entirely outside of the loop of the bumper-wing $h$. Indeed, were the mud-guard $c$ forced between the arms of the loop, such interposition of the mud-guard would seriously interfere with the supporting action that the inner arm affords to the outer arm of the loop, for these arms are especially shaped to bring about their cooperation in this respect and must lie closely juxtaposed to effect the same. Attention is further called to the tandemlike relation in which the tangs $j$, $j^x$, lie; they are in line with each other and lie in the same vertical plane, and the tip-end of the tang $j$ is spaced a substantial distance from the cooperating tang $j^x$. The securing devices $i'$, $i''$, are independent in their action; that is, each secures its own tang independently of the other tang.

The combination of the tire-carrier $f$ with the wheel guard fenders $h$ affords good protection to the automobile from damage during collision. The tire-carrier $f$ protects the body $a$, while the fender-wings $h$ protect the wheel-guards $c$ opposite the ends of which they are located. But it is to be observed that the bumper-wings $h$ are not attached to and form no part of the spare-tire-supporting structure.

As will appear from an inspection of Fig. 2, the wheel-guard fender or bumper-wing $h$ is in the form of a loop open at its inner end $i'$, $i''$, where it is attached to the side of the automobile $a$. During the continuance of collision action, the inner supporting arm $h''$ is so arranged that it is in position to afford support to the outer collision or impact-receiving arm $h'$; and the active or working lengths of these arms $h'$, $h''$, are approximately equal to each other.

I claim:

1. An automobile bumper-wing for projection laterally from the side of an automobile and opposite one of the wheel-protecting mud-guards or fenders thereof, comprising a single piece of spring-metal which is bent back upon itself to form a narrow, elongated loop the body of which serves as the collision part of the bumper-wing and includes a pair of loop-forming arms that are integral with each other and lie so closely together that the space between them is incapable of receiving the mud-guard, both of the arms being of concavo-convex shape and having their concave sides facing the mud-guard that they protect from collision injury; the inner end of each arm being bent towards the mud-guard to form a tang that serves as an attaching-iron for the bumper-wing, the tangs, in their bumper-wing-attaching relation, lying one directly behind and in line with the other, tandemlike, and in the same vertical plane; the tip-end of one tang being spaced a substantial interval away from the cooperating tang and the tangs being provided with separate securing devices each of which secures its own tang independently of the other tang.

2. A pair of automobile bumper-wings for projection laterally from opposite sides of an automobile and positioned on opposite sides of the spare-tire-supporting structure thereof that lies between the bumper-wings, each of which lies opposite one of the wheel-protecting mud-guards of the automobile and comprises a single piece of spring-metal that is bent back upon itself to form a narrow, elongated loop the body of which serves as the collision part of the bumper-wing and includes a pair of loop-forming arms that are integral with each other and lie so closely together that the space between them is incapable of receiving the mud-guard, both of the arms being of concavo-convex shape and having their concave sides facing the mud-guard that they protect from collision injury; the inner end of each arm being bent towards the mud-guard to form a tang that serves as an attaching-iron for the bumper-wing and the tangs, in their bumper-wing-attaching relation, lying one directly behind and in line with the other, tandemlike, and in the same vertical plane, the tip-end of one tang being spaced a substantial interval away from the other tang; and the tangs being provided with separate attaching devices, each of which secures its own tang independently of the other tang; the bumper-wings being devoid of any attached relation to the spare-tire-supporting structure and protecting, in conjunction with the latter, the rear end of the automobile from collision injury.

Signed at the city and county of San Francisco, State of California, in the presence of the two undersigned witnesses, this 28th day of December, 1920.

CONRAD C. HANSEN.

Witnesses:
 B. WILSON,
 E. DOWNING.